Figure 1:
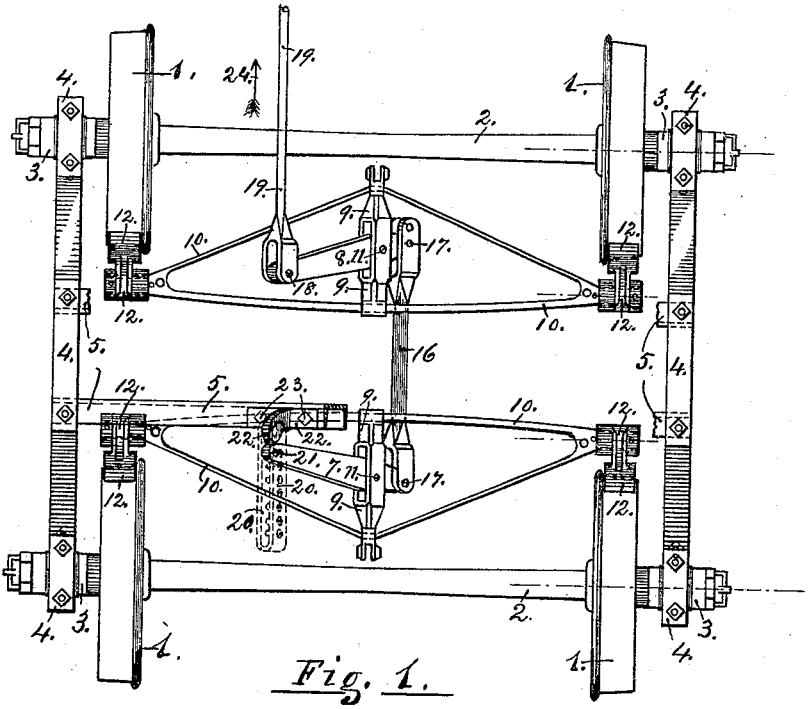

No. 639,616. Patented Dec. 19, 1899.
C. V. ROTE.
CAR BRAKE ADJUSTER.
(Application filed Apr. 24, 1897.)

(No Model.) 3 Sheets—Sheet 1.

Witnesses:
Elmer E. Seufts
Melvin P. Miller

Inventor:
Charles V. Rote,
By
Danl. H. Herr,
Attorney.

No. 639,616. Patented Dec. 19, 1899.
C. V. ROTE.
CAR BRAKE ADJUSTER.
(Application filed Apr. 24, 1897.)
(No Model.) 3 Sheets—Sheet 2.

Witnesses: Inventor:
Elmer E. Sieg Jr. Charles V. Rote.
Melvin P. Miller By Dan'l H. Herr,
Attorney.

No. 639,616. Patented Dec. 19, 1899.
C. V. ROTE.
CAR BRAKE ADJUSTER.
(Application filed Apr. 24, 1897.)
(No Model.) 3 Sheets—Sheet 3.
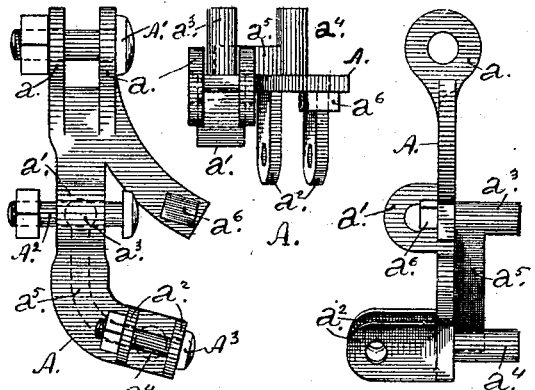
Fig. 6.
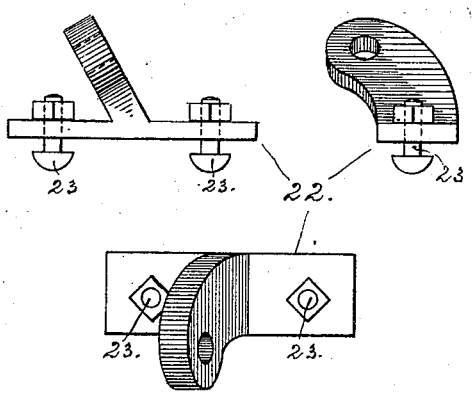
Fig. 5.
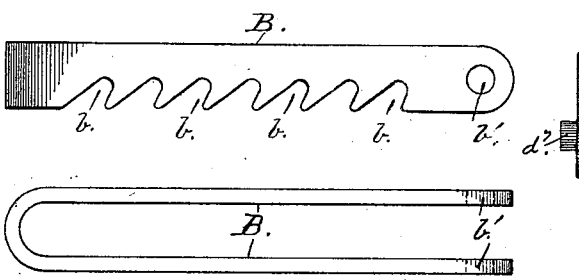
Fig. 7.
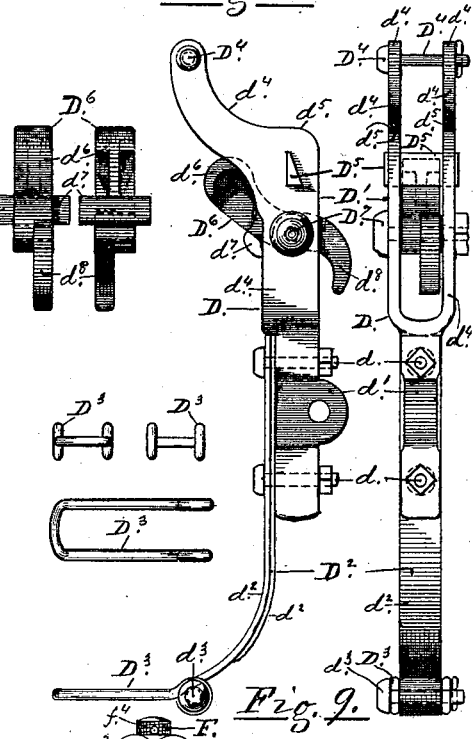
Fig. 9.
Fig. 8.
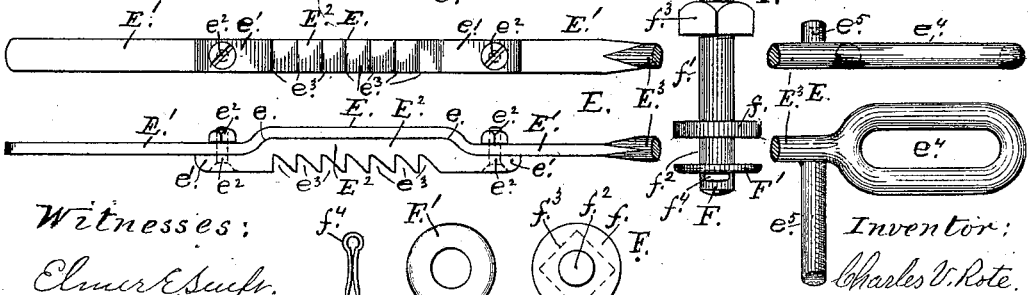
Fig. 10.
Witnesses:
Elmer E. Swift.
Melvin P. Miller.
Inventor:
Charles V. Rote.
By Dan'l H. Herr.
Attorney.

UNITED STATES PATENT OFFICE.

CHARLES VICTOR ROTE, OF LANCASTER, PENNSYLVANIA, ASSIGNOR OF ONE-HALF TO RICHARD BLICKENDERFER, OF SAME PLACE.

CAR-BRAKE ADJUSTER.

SPECIFICATION forming part of Letters Patent No. 639,616, dated December 19, 1899.

Application filed April 24, 1897. Serial No. 633,587. (No model.)

*To all whom it may concern:*

Be it known that I, CHARLES VICTOR ROTE, a citizen of the United States, residing at Lancaster, in the county of Lancaster and State of Pennsylvania, have invented certain new and useful Improvements in Car-Brake Adjusters; and I do hereby declare the following to be a full, clear, and exact description of the invention, such as will enable others skilled in the art to which it appertains to make and use the same.

This invention relates to improvements in a car-brake adjuster of that class in which certain elements or devices are applied to and operated by the upper or longer ends of the live and dead truck-levers of any approved brake system now in use; but of course modifications may have to be made therein and in their application to meet the conditions of the different systems.

The object of the invention is to provide simple means that may be readily applied to automatically take up the surplus slack, which is constantly accruing, in the brake gear or rigging, let the same be applied to either freight-cars or passenger-coaches, till the brake-shoes shall be completely worn out; to permit the replacing of worn-out brake-shoes by new ones without alteration or change in the devices, and to supply said means at the minimum cost of construction, as well as to maintain or hold the stroke of the piston or the motion of other brake-applying means without loss of power constantly within certain limits, which limits are usually prescribed.

The elements of the invention, as well as the functions they perform, will severally and at large appear in the following description, and they will be separately and collectively set forth in the claims.

The purposes of the invention are attained by the mechanism and devices illustrated in the accompanying drawings, similar reference characters designating like parts throughout the several views, in which—

Figure 2:
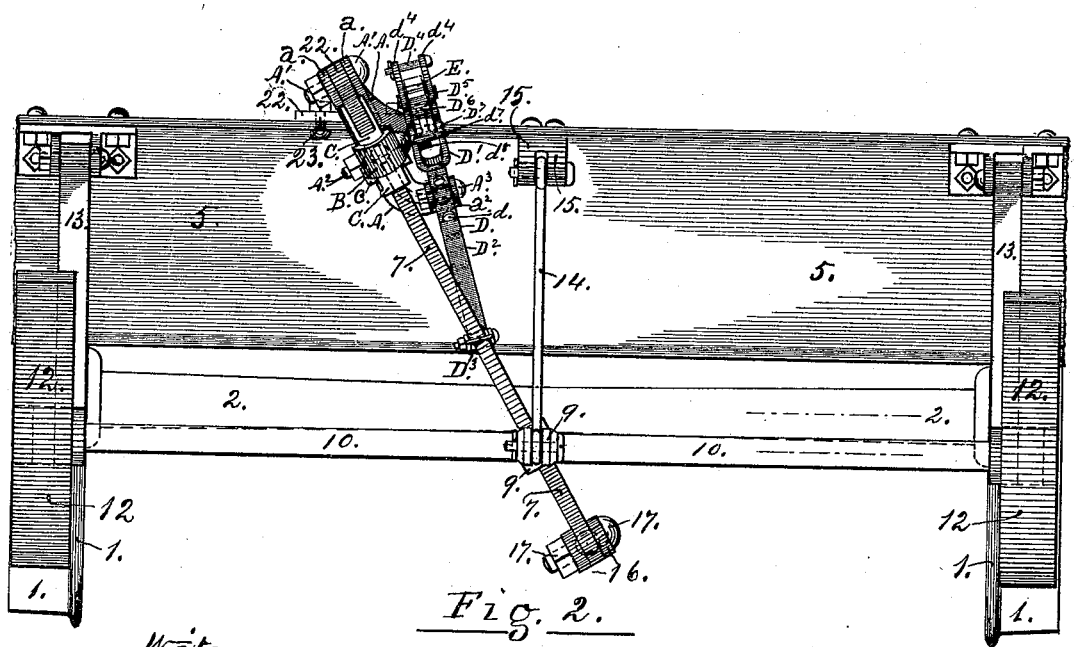
Figure 3:
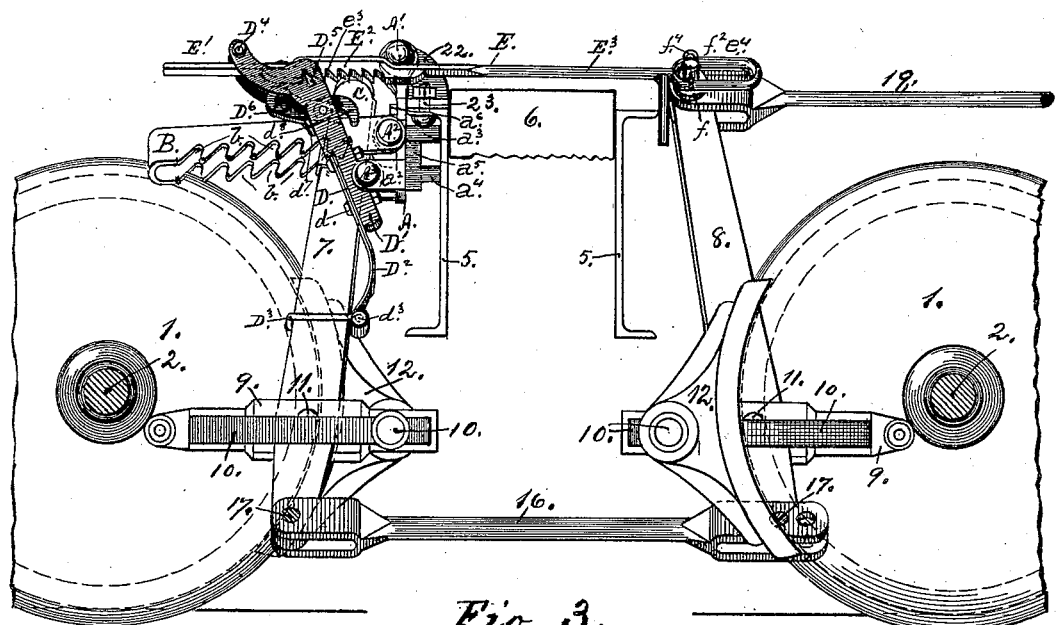
Figure 4:
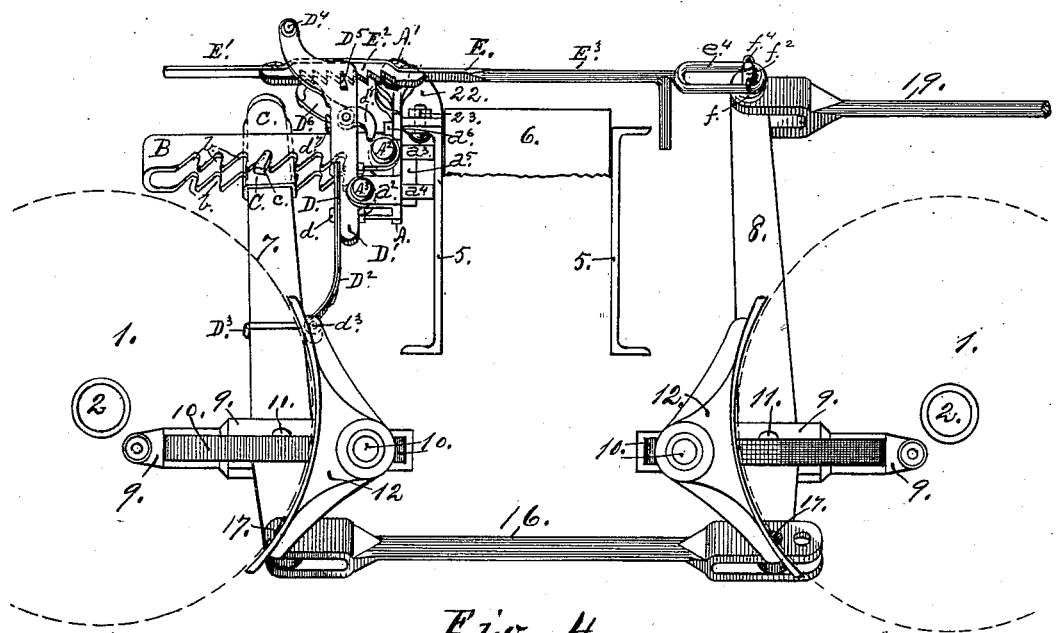

Figure 1 is a top view of a four-wheel truck with portions from the center omitted, showing in position a system of brake-levers, beams, and shoes in place, with a portion of the pull-rod removed; Fig. 2, an enlarged view, from below, of Fig. 1, showing the elements of the invention in position on the dead-lever end of the truck, with the side portions broken away and the near wheels and axle removed. Figs. 3 and 4 are views from the right of Fig. 2, showing the elements of the invention in the positions they respectively appear when new and partially worn shoes are applied; and Figs. 5, 6, 7, 8, 9, and 10 are still more enlarged views showing details and combinations of said elements detached from their positions on said truck.

In order that the invention may be best set forth, as well as the manner in which its functions are performed, attention will be given, first, to a four-wheel truck such as is used in the construction of the most approved freight-cars at the present time, as well as in that of many passenger-coaches; second, to a combination of levers, rods, brake-beams, and shoes, adopted by the Master Car-Builders' Association, to be used in connection with the Westinghouse quick-action brake system, and, third, to the elements of the invention proper, as well as to the manner in which they perform their functions. In the first two numerals will designate the several parts, while in the last letters will be used for that purpose.

In the construction of the truck here shown wheels 1 are mounted on axles 2, which have their ends journaled in bearing-boxes 3, shown to be secured into the extremities of the usual side pieces 4 of the well-known iron truck-frame, and the side pieces, in their central portions, support the ends of channel-bars 5, which have in the space between them the usual springs (not shown) and the bolsters 6. The side pieces of the frame are omitted in Figs. 3 and 4, while a portion of the top bolster only is shown in place, and portions of the channel-bars are broken away in Fig. 1 to better show the brake-beams and their connections.

In the arrangement of the levers, rods, brake-beams, and shoes shown in the drawings 7 and 8 designate, respectively, the dead and live levers, and 9 designates the struts of the trussed brake-beams 10. Through the bodies of these struts and at prescribed distances from their ends these levers are pivoted in place by bolts or pins 11, said levers being laterally or sidewise inclined, so as to lie in the same plane, but oppositely disposed, one being on each side of the channel-bars of the truck with the dead-lever always toward the end of the car, and the brake-beams are also oppositely disposed. The outer ends of the brake-beams having on each extremity a brake-shoe 12 are held suspended by links 13, depending from the top flanges of the channel-bars, while parallel rods 14 suspend the outer ends of the struts, which rods depend from the outer ends of spring-arms 15, having their inner ends secured to said top flanges at the centers thereof. A bottom rod 16 connects the lower ends of the levers in having its extremities pivoted to said ends by bolts or pins 17, while the upper end of the live-lever has pivoted thereto, by a bolt or pin 18, one end of a pull-rod 19 (partially shown) connecting said lever end with the brake drawing or operating mechanism, and the upper end of the dead-lever is held in position by a fulcrum fold 20, (indicated by dotted lines in Fig. 1,) embracing said lever end, with a pin 21 therethrough, and having its open end pivoted to the inclined lug of the bracket 22, with its base rigidly secured, as by bolts and nuts 23, to the top of the flange of the adjacent channel-bar.

Now, the parts just described comprise the elements approved by the Master Car-Builders' Association, and Fig. 1 of the drawings shows them in the positions they appear in the Westinghouse quick-action brake system when new shoes are in place on the brake-beam ends ready to engage the treads of their respective wheels under a pull on the rod 19 in the direction of the arrow 24; but in the positions shown and before said pull takes effect there is between each shoe and the adjacent wheel-tread the required space, permitting the free turning or running of said wheels without their treads contacting with said shoes. This space between the wheel-treads and the adjacent shoes gives rise to what is known as "slack" and permits what is called the "necessary play" in the consequent motion or shaking of the brake-rigging. All space here in excess of this is known as "surplus slack" or a "surplusage of slack," which is constantly increasing accordingly as the shoes wear away, and to effectually, as well as automatically, take up this excess or surplusage of slack until the brake-shoes shall be completely worn out is the prime object of this invention, while a secondary object is guarding against injury to the brake-rigging or to the device, and its elements will now be considered.

Since the bracket 22, before mentioned, serves to support in position on the truck the chief portions of the invention in one body, it is shown in detail in the three detached views of Fig. 5—namely, a top plan, a side, and an end elevation—with the securing-bolts 23 through its base and nuts screwed home thereon in place, while its upwardly-projecting lug, to which said elements are attached and from which they depend, has a prescribed side slope, so as to stand in the same plane in which the live and dead levers incline, and through the eye in the upper forward portion of the lug a pin or bolt, yet to be described, is passed, securing said body of parts in position and allowing them to be readily removed.

Holding the parts above referred to each one in operative position is a specially-formed hanger A, (illustrated in the three views of Fig. 6,) which hanger, extending downwardly in the direction of the dead-lever and lying in the plane thereof, has a bifurcated upper end embracing the inclined lug of the bracket 22, and the jaws $a$ of said end, lying close to the sides of said lug, firmly support the hanger in its inclined position, while a bolt A', passed through the bodies of the jaws and through the eye of the lug, with a nut on its threaded end, removably secures said hanger in place. At a prescribed point on its rearward face the body of the hanger is provided with an outwardly-projecting lug $a'$, having a bolt $A^2$ through its eye, with a nut on its end to pivot thereto the open end of a fulcrum fold or loop, yet to be described. The lower end of the hanger, curving sidewise at a prescribed angle and extending a prescribed distance, has on its rearward face two outwardly-projecting ears or lugs $a^2\ a^2$, having a bolt $A^3$ therethrough, with a nut on its threaded end, and so arranged as to pivotally hold in the required direction or slope a slack-take-up or forcing-lever, also yet to be described. It will here be noted that the nuts may be omitted from the three bolts above mentioned and cotter-pins passed through their bodies to hold the bolts in place. From the forward face of the hanger, at points respectively opposite the lug $a'$ and the ears $a^2$, are projections or posts $a^3$ and $a^4$, all integrally joined or connected by a strengthening web or rib $a^5$, as shown by full and dotted lines, said posts, abutting against the adjacent channel-bar, giving steady support to the lower or loose end of said hanger. Near the upper end of the hanger is a sidewise-curving branch toward the same side as the curved arm, before mentioned, and, resting against the top flange of the channel-bar, as shown, has on its outer face, near the extremity thereof, an outwardly or rearwardly projecting lug $a^6$, adapted to receive the impact of or to be engaged by the forward end of a trip-lever, yet to be described.

In the four views of Fig. 7 is shown a fulcrum fold or loop B having saw-like teeth or notches $b$ cut through their under edges upwardly into the sides of the fold, said notches to be successively engaged by pawl ends or lugs projecting from the sides of a sleeve, yet to be described. These teeth have a prescribed pitch and are so arranged as to allow said pawl ends or lugs to move freely rearward or toward the closed end of the loop, while they positively prevent motion in the opposite direction or forwardly toward its open end. This loop, having an eye $b'$ in each side near to the open end thereof, embraces the upper portion of the dead-lever, with the lug $a'$ between the sides in said open end, and the bolt $A^2$, before mentioned, through said eyes, as well as through said lug, serves to pivot said loop in place or the hanger and loop together.

The three views in Fig. 8 show a sleeve C adapted to be placed onto the upper end of the dead-lever so as to be between the folds of the fulcrum fold, as shown. On each side of the sleeve are two upwardly-sloping and forwardly-disposed outwardly-projecting pawl-lugs $c\ c$ to successively engage the notches $b$, before mentioned, effectively stopping all forward progress to this dead-lever end and from any notches whichever they may engage. It will here be noted that should the body of a lever be somewhat too narrow where the sleeve is to be applied a wedge or key $c'$ of the required thickness may be inserted to fill the gap, securing the sleeve in place, as is indicated by the dotted lines in Fig. 8, and that the lugs $c\ c$ may be omitted from the sides of the sleeve, with pawl ends (not shown) pivoted thereto in place to engage said notches. It will also be noted that this successive engagement of the notches $b$ by said lugs or pawl ends constantly changes the upper end fulcrum of the dead-lever, taking up the surplusage of slack as it occurs from the wearing away of the brake-shoes. To compel or force this change of fulcrum at the upper dead-lever end, a lever D, such as is shown, with its several parts, in combination and in detail, in the views of Fig. 9, will now be considered. This lever comprises an upper and rigid portion $D'$ and a lower end yielding or spring portion $D^2$, firmly secured or bound together by bolts and nuts $d\ d$, so as to practically constitute one body, with a pivot lug or ear $d'$, having an eye therethrough, situated practically at the center or middle distance of the lever. This lug is placed between the ears $a^2$, before mentioned, when the bolt $A^3$, also before mentioned, passed through said eye and through said ears, serves to pivot said lever in place or the lever and hanger together. The bolted-on yielding portion $D^2$ of this lever is preferably made of approved straps $d^2\ d^2$, of properly-tempered spring metal, rearwardly curving, as shown, with its lower end, where connection is made with the dead-lever, preferably bearing against the adjacent edge of said dead-lever and its extremity provided with a suitable eye, through which a clevis-link $D^3$, embracing the body of the dead-lever, as shown, has its open end pivoted, completing said connection by a bolt or pin $d^3$, held in place by a cotter-pin, as shown; but washers may first have been placed against the sides of said spring-arm end, said staple drawing the dead-lever with it in the forward moving of the spring-arm end and holding the lever D in position to have its upper end engage successive notches in a rack or ratchet connecting bar, yet to be described, with the resiliency of the arm yielding reflex motion to the dead-lever when there is not sufficient slack to permit the engagement of succeeding notches in the fulcrum fold, but allowing again the engagement of the same notches, fixing the dead-lever fulcrum, without straining, to said lever D or to the brake-rigging when the brake-shoes, under such conditions, are pressed onto the wheels in applying the brakes. The upper end or rigid portion $D'$ of the lever above the spring ends is practically composed of two flat sides or walls $d^4\ d^4$, having an abrupt offset $d^5$ a prescribed distance from the pivot-lug $d'$, whence said sides extend rearwardly and upwardly, curving to prescribed points, where their extremities are joined by a bolt $D^4$, passed through them and secured, as by a cotter-pin, said sides forming an oblong U-shaped recess between them to accommodate certain elements yet to be described. At prescribed distances from the offset $d^5$ and from the rearward edges of the sides $d^4$, extending across the recess, with the ends thereof rigidly secured into or through said sides, is arranged a practically wedge-shaped strip or pawl-piece $D^5$, adapted to successively engage the notches of the rack or ratchet bar above mentioned and so disposed by reason of said engagement to cause the upper end of the lever D to move forwardly with the forward progress of said bar. At a prescribed distance below said strip and also within said recess is arranged a tilting or trip lever $D^6$, being centrally pivoted in place by a bolt $D^7$, passed through its body and through the sides, with a nut on its threaded end, said trip-lever having a weighted rearward end $d^6$ weighing it down, with central side lugs $d^7$ stopping downward progress by engaging the sides $d^4$, and having a downwardly-curving forward or inner end finger $d^8$ to tilt or trip the lever $D^6$, causing its weighted end to rise on coming in contact with the projection or lug $a^6$, before mentioned, which lug said curved end finger is adapted to engage and which it always will engage on sufficient forward motion being given to this end of the lever D, and thereby lift the notches of said rack-bar out of engagement with said pawl-piece, preventing all possibility of strain or injury to the lever D and rigging.

As shown in Figs. 3 and 4, a rack-bar E (illustrated, with its separate parts, in the several views of Fig. 10) has its rearward end applied to the upper end of the lever D and its forward end connected or joined to the upper end of the live-lever 8, and it is the function of this bar, through its connection with the live-lever end, joined with its application to the lever D, to so operate the latter that it will compel the fulcrum adjustment at the dead-lever end to readily take up any surplus slack in the brake-rigging. The rearward end of the bar, being preferably a flat strap $E'$, is passed underneath the bolt $D^4$ through the space between the sides $d^4$, with its under face riding on the pawl-piece $D^5$ and its rearward end extending a prescribed distance beyond the rearward edges of said sides $d^4$, all serving to keep it confined in said space and its under face on the upper edge of said pawl-piece. In order that the bar E, forwardly moving, may draw the upper end of the lever D with it, said bar must be made to couple therewith, and to this purpose the lower face of the strap E' at the requisite point is provided with a prescribed recess $e$, into which is fitted a block $E^2$, whose ends $e'$ $e'$ rest against the under face of the strap outside the extremities of the recess, while bolts and nuts $e^2$ $e^2$, as shown, serve to rigidly secure said block in place or the block and strap together, and in the under face of the block are formed teeth or notches $e^3$, having practically vertical rear end walls to engage the pawl-piece $D^5$ in the forward-moving and downwardly-sloping forward end faces to freely pass over said pawl-piece in the rearward motion while said teeth are closer together, having a less pitch than the teeth $b$ of the fulcrum fold before mentioned in order that they may successively engage the pawl-piece $D^5$ under a short rearward motion of the rack-bar E. The forward portion of this bar is preferably a round rod $E^3$, integrally forged with the strap E', before mentioned from one piece, or they may be separately formed and welded together into one piece, constituting the rack-bar E. At the forward end of the bar, integral with the round portion thereof, is an oblong eye or loop $e^4$, having a prescribed length, adapted to engage on the end of a coupling pin or bolt, yet to be described, connecting this end of the bar with the upper end of the live-lever or with the attached end of the pull-rod, as shown, the length of the eye permitting motion back and forth therein to said coupling-pin equal to the required play of the brake-rigging without disturbing the slack-take-up mechanism or pressing the brake-shoes against the wheels. Rearward of the eye $e^4$ the bar is provided with a downwardly-projecting pin or lug $e^5$ to contact with the top flange of the forward channel-bar, stopping the bar E from moving farther rearwardly and preventing the engagement of notches when such engagement is not required.

In connecting the forward end of the bar E with the upper end of the live-lever 8 the pin or bolt 18, before mentioned, is removed and a bolt F, having a collar or shoulder $f$ and branches $f'$ $f^2$, used instead, said bolt having its branch $f'$ passed through the jaws of the pull-rod 19 and through the eye in the live-lever end, with a nut $f^3$ on the threaded end of the bolt securing said bolt in place and a pin, such as $f^4$, through its body preventing the nut from coming off, the collar $f$ serving as a bolt-head and having its branch $f^2$ passed through the loop $e^4$, with a washer F' thereon, and a cotter-pin $f^4$ through its body serves to secure said eye in place, completing the connection; but the washer is omitted from the joint in Figs. 3 and 4 to better show the loop-eye and its connection.

Now, the several parts hereinbefore described and occupying the respective positions indicated in the drawings, Fig. 3 showing them in the positions when new shoes are first applied and Fig. 4 when said shoes are partially or nearly worn out, in both cases the normal space being between the shoes and their respective wheel-treads, the following observations will be noted: First, that the motion of the pin $f'$, back and forth in the loop-eye $e^4$ permits the play or shaking of the brake-rigging without disturbing the take-up mechanism before a forward pull on the rod 19 begins to press the wheels, which it begins to do when the pin $f^2$ is in the forward end of said loop-eye $e^4$; second, that the continuance of this pull draws the rack-bar E with it, moving the upper end of the lever D forwardly and its lower end rearwardly, with a pressure against the forward edge of the dead-lever end, transferring the force of said pull to the upper dead-lever end, causing said end to move rearwardly and the pawl-lugs $c$ $c$ to engage successively the notches $b$ $b$, taking up the surplus slack when a sufficiency has accrued from the wearing away of the brake-shoes; third, that reversing this forward pull, with succeeding rearward notches engaged in the fulcrum fold and the lever D held in the corresponding position by the clevis-link $D^3$, the rearward motion of the bar E through the upper end of said lever will cause the pawl-piece $D^5$ to engage succeeding notches $E^3$ forwardly, in the under face of the block $E^2$, in the rearward end of said bar, shortening the distance between the upper-end connections of the forcing and live levers, respectively; fourth, that this take-up action or change of fulcrum at the upper dead-lever end will continue until a set of brake-shoes shall be completely worn out without injury or strain to either the take-up mechanism or brake-rigging and without relatively changing the position of the upper live-lever end, and, fifth, that this change of fulcrum at the upper dead-lever end without materially affecting the upper live-lever end practically maintains the stroke of the piston or other brake-applying means without loss of force or power within certain prescribed limits.

Having thus described the invention and ascertained and set forth the manner in which its functions are performed, what I do consider new, and desire to secure by Letters Patent, is—

1. In a car-brake system of the character described, the car-brake adjuster comprising: a hanger depending from the dead-lever end of the truck in the plane of the dead-lever, a fulcrum fold with forwardly-opposing notches in the under faces of its sides embracing the upper dead-lever end and having its open end pivoted to said hanger, projections from the dead-lever sides succesively engaging the notches of said fold, a forcing-lever having a rigid upper end portion and a yielding lower end portion and centrally pivoted to the lower end of the hanger with the lower extremity of said yielding portion movingly connected to the body of the dead-lever and a rearwardly-opposing pawl-piece secured between two sides near to the upper end of said rigid portion, a rack-bar having in its rearward portion rearwardly-opposing notches to be successively and forwardly engaged by said pawl-piece and an oblong eye at the extremity of its forward portion with a stop-lug rearward of said eye and projected downwardly from said rack-bar, and a pin engaging said eye projecting from the upper live-lever end, all substantially as described and for the purpose hereinbefore set forth.

2. The combination in a car-brake adjuster with the dead and live truck-levers in a car-brake system of the character described, of a hanger in the plane of said levers and depending from the top of the truck on the dead-lever end thereof, a fulcrum fold embracing the upper end of the dead-lever with forwardly-opposing notches in the under edges of its sides and having its open end pivoted to the rearward face of said hanger, pawl-lugs projected from the body of the dead-lever to successively engage the opposing notches of said fold, a take-up forcing-lever having a rigid upper portion and a yielding lower portion centrally pivoted to the lower end of the hanger on the rearward face thereof, a link connecting the lower end of said yielding portion with the body of the dead-lever and a rearwardly-opposing pawl-piece arranged between and secured into the sides near the upper end of said rigid portion, a rack-bar having in the under face of its rearward portion rearwardly-opposing notches to be successively engaged by said pawl-piece and at the end of its forward portion an oblong eye with a lug rearward of the eye and projected from the under side of the bar, a pin projected from a side of the upper live-lever end engaging said eye, and a trip-lever provided in the upper end of the take-up forcing-lever to lift the rearward end of said rack-bar, all substantially as described and for the purpose hereinbefore set forth.

3. In a car-brake adjuster of the character described the hanger A, having the upper end pivot-jaws $a$ with pivot-eyes through their bodies and the pivot pin or bolt A′ in said eyes, the central rearwardly-projecting fulcrum-fold pivot-lug $a'$ with a pivot-eye through its body and the pivot pin or bolt $A^2$ in said eye, the lower end side-curving branch having the rearwardly-projecting forcing-lever pivot-ears $a^2$ at the extremity thereof with pivot-eyes through their bodies and the pin or bolt $A^3$ in said eyes, the forwardly-projecting abutting lugs $a^3 a^4$ opposite said pivot lug and ears and the strengthening-rib $a^5$ joining said lugs, and the upper side-curving branch with the rearwardly-projecting trip-lever abutting lug $a^6$, all substantially as described and for the purpose hereinbefore set forth.

4. In a car-brake adjuster of the character described the upper end dead-lever sleeve C having the upwardly-sloping forwardly-inclined pawl-lugs $c$ projecting outwardly from the opposite sides of said sleeve, substantially as described and for the purpose hereinbefore set forth.

5. The combination in a car-brake adjuster of the character described with a fulcrum fold having its open end pivoted to a hanger as shown and forwardly-opposing rearwardly-sloping notches through their under edges in its sides with a dead truck-lever having its upper end movable back and forth between said sides, of a sleeve between the sides of said fold and mounted on the upper end of said dead-lever, and having side-projecting pawl-lugs to successively and rearwardly engage said notches, all substantially as described and for the purpose hereinbefore set forth.

6. In a car-brake adjuster of the character described the take-up forcing-lever D having the rigid upper end portion D′ and the yielding lower end portion $D^2$, the bolts and nuts $d$ through their overlapping ends securely joining said portions, the central pivot-lug $d'$ with the pivot-eye through its body, the lower end outwardly-curving spring-metal straps $d^2$ constituting said yielding portion with a coiled fold at the extremity thereof forming the link-pivot eye, the dead-lever embracing staple-link $D^3$ having its open end against the ends of said pivot-eye with the bolt $d^3$ therethrough and the cotter-pin to complete the pivot-joint, the side walls $d^4$ forming the U-shaped recess opening through the top of the upper end rigid portion and having at their upper ends the outwardly and upwardly curving arms with the abrupt offset $d^5$ as shown and the bolt and nut $D^4$ joining the upper ends of said arms, the upwardly-narrowing wedge-shaped pawl-piece $D^5$ extending across said recess below said offset with its extremities secured into said side walls, the trip-lever $D^6$ with the weighted rearward end $d^6$ and the central under face sidewise-projecting stop-lugs $d^7$ and the downwardly-curving forward end finger $d^8$ placed within and through said recess below said pawl-piece, and the bolt $D^7$ passing through the sides and through the trip-lever with a nut on the threaded end pivoting the latter in place, all substantially as described and for the purpose hereinbefore set forth.

7. The combination in a car-brake adjuster of the character described with a hanger depending from the dead-lever end of the truck, a fulcrum-fold having forwardly-opposing under-edge notches in its sides and its open end pivoted centrally to said hanger, the upper end of the dead-lever movable back and forth between the sides of said fold and having side projections to successively engage said notches, of a take-up forcing-lever with a rigid upper end portion and a yielding lower end portion, said portions rigidly joined and centrally pivoted to the lower end of the hanger, a link connecting the lower end of said yielding portion with the body of said dead-lever, and a rearwardly-opposing pawl-piece secured in the upper end of said rigid portion, with means provided to engage said pawl-piece whereby said rigid portion will be forwardly drawn, substantially as described and for the purpose hereinbefore set forth.

8. In a car-brake adjuster of the character described, the rack-bar E comprising the rearward strap portion E' having the recess $e$ in its under face and the block $E^2$ fitted into said recess with the ends $e'$ resting against said face and the bolts $e^2$ with nuts thereon securing said block in place and the block having in its under face the rearwardly-sloping notches $e^3$, and the forward rod portion $E^3$ having at its extremity the oblong loop-eye $e^4$ and rearward thereof the downwardly-projecting stop-lug $e^5$, all substantially as described and for the purpose hereinbefore set forth.

9. The combination in a car-brake adjuster of the character described having a hanger depending from the dead-lever end of a truck, a fulcrum fold with forwardly-opposing under-edge notches in its sides and having its open end pivoted centrally to said hanger, the dead-lever with its upper end movable back and forth between the sides of said fold and having pawl projections from its sides successively engaging said notches, with a take-up forcing-lever centrally pivoted to the lower end of said hanger, said lever having an upper end rigid portion and a lower end yielding portion with the lower extremity link connected to the body of the dead-lever, and a rearwardly-opposing pawl-piece secured between the sides thereof near the upper end of said rigid portion, of a rack-bar having in its under face toward one end thereof rearwardly-opposing notches successively engaging on said pawl-piece, at the extremity of the other end an oblong loop-eye engaging, backwardly and forwardly moving, on a pin projecting from the head of the coupling-bolt of the upper live-lever end, and inwardly from said eye a downwardly-projecting stop-lug, with a trip-lever provided in said rigid portion to lift the notches of said rack-bar out of engagement with said pawl-piece, all substantially as described and for the purpose set forth.

In testimony whereof I affix my signature in presence of two witnesses.

CHARLES VICTOR ROTE.

Witnesses:
HARVEY B. LUTZ,
FRED. P. MENTZER.